United States Patent [19]
Roth

[11] Patent Number: 5,353,831
[45] Date of Patent: Oct. 11, 1994

[54] TUBE-PIERCING CLAMP ON VALVE ASSEMBLY

[75] Inventor: Marcus J. Roth, Hallandale, Fla.

[73] Assignee: Watsco Components, Inc., Hialeah, Fla.

[21] Appl. No.: 202,393

[22] Filed: Feb. 25, 1994

[51] Int. Cl.⁵ ..................... F16L 41/06; F16K 51/00
[52] U.S. Cl. ......................... 137/318; 30/366; 222/83; 285/197; 408/95
[58] Field of Search ............. 30/124, 366; 83/745; 137/230, 331, 315, 317, 318; 222/5, 81, 83, 91; 285/197, 198, 199; 408/95, 102, 103

[56] References Cited

U.S. PATENT DOCUMENTS

| | | | |
|---|---|---|---|
| 174,542 | 3/1876 | Letzkus | 137/318 |
| 210,706 | 12/1878 | Penney | 137/318 |
| 3,428,075 | 2/1969 | Wagner | 137/318 |
| 3,448,758 | 6/1969 | Mullins | 137/318 |
| 3,509,905 | 5/1970 | Mullins | 285/197 |
| 3,543,788 | 12/1970 | Mullins | 137/318 |
| 3,547,144 | 12/1970 | Mullins | 137/318 |
| 3,714,959 | 2/1973 | Pignataro, Jr. | 137/318 |
| 3,732,886 | 5/1973 | Mullins | 137/318 |
| 3,788,345 | 1/1974 | Tura | 137/318 |
| 3,840,967 | 10/1974 | Olson | 137/328 |
| 3,978,881 | 9/1976 | Mouranie | 137/318 |
| 4,018,246 | 4/1977 | Langstroth | 137/318 |
| 4,204,559 | 5/1980 | Wagner | 137/318 |
| 4,611,624 | 9/1986 | Snyder | 137/318 |
| 5,275,013 | 1/1994 | Price et al. | 137/318 |

Primary Examiner—George L. Walton

[57] ABSTRACT

A line-piercing valve assembly comprising first and second clamp housings, adapted to releasably clamp onto a line or section of tubing, a piercing pin insertable within the internal bore of a projection formed on one of the clamp housing, and, a separate one-way valve which mounts within the projection after removal of the piercing pin and can itself be removed and replaced in the event of damage or malfunction.

9 Claims, 3 Drawing Sheets

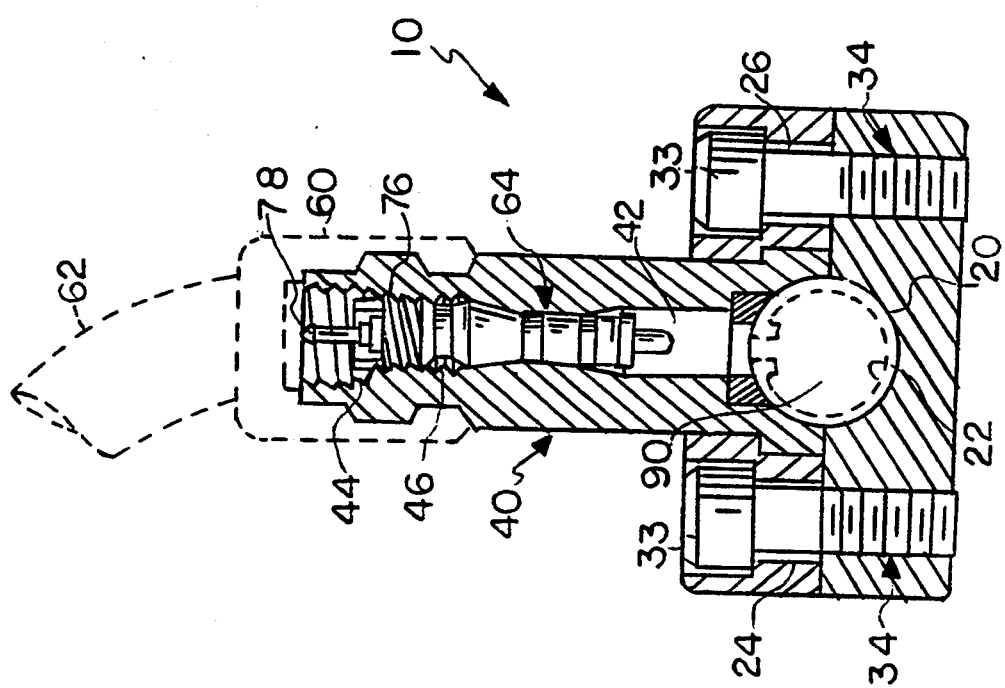
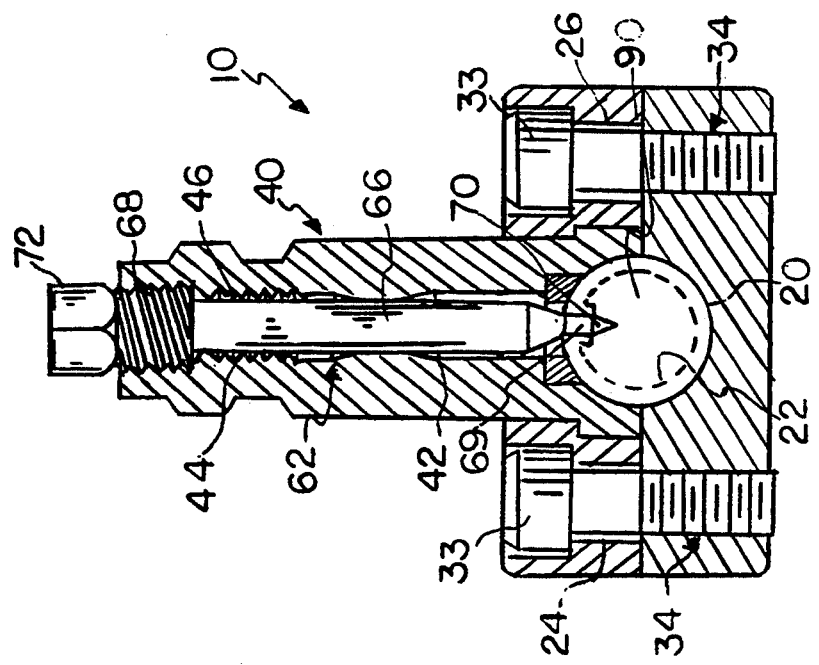

TUBE-PIERCING CLAMP ON VALVE ASSEMBLY

FIELD OF THE INVENTION

This invention relates to valve assemblies, and, more particularly, to a valve assembly which clamps onto a tubular line, punctures or pierces the line to provide access to its interior, and then permits the injection of liquid or gaseous material into the line through a one-way valve removably mounted to the valve assembly.

BACKGROUND OF THE INVENTION

Increasing concerns with the effects of Freon and other refrigerant gases on the ozone layer of the atmosphere have led to the adoption of regulations controlling the discharge and use of refrigerant gases. Regulations have been promulgated for the automotive industry in the United States requiring new automobiles manufactured in the years to come to employ "ozone-friendly" refrigerants which do not damage the earth's protective ozone layer.

Nevertheless, there are literally millions of automobiles currently in use, and to be manufactured before the new emission regulations come into effect, having air-conditioning systems which employ Freon or other refrigerant gases which are harmful to the ozone layer. It is contemplated that vehicles whose air-conditioning systems are compatible with the new, ozone-friendly refrigerants may be recharged with such new refrigerants during periodic maintenance, but in order to insure that harmful refrigerants are not employed, recharging fittings associated with older automotive air-conditioning systems will not be compatible with the charging equipment employed with new refrigerants.

Accordingly, a need exists for a method to charge the air-conditioning systems of automobiles currently in use with new, ozone-friendly refrigerant through a means other than their existing charging fittings. One proposal has been to employ valve assemblies capable of clamping onto the refrigerant line of essentially any automotive air-conditioning system, piercing that line to provide access to its interior, and then introducing the new ozone-friendly refrigerant therethrough. Line piercing valves of this general type are disclosed, for example, in U.S. Pat. No. 4,611,624 to Snyder, owned by the assignee of this invention. The '624 Snyder patent discloses a valve assembly having housing elements which clamp onto a section of tubing, one of which is formed with a projection having an internal bore carrying a one-way valve including a piercing pin at its lowermost end. Structure is provided to axially move the one-way valve within the projection of the clamping element so that its piercing pin punctures the tubing to provide access to the tubing interior. Material such as refrigerant can then be introduced through the one-way valve into the tubing.

One limitation of valve assemblies of the type disclosed in the '624 patent is that difficulties arise in the event of failure of the one-way valve. Because the one-way valve in the '624 Snyder patent is permanently mounted within one of the clamping elements, a failure of such one-way valve requires replacement of the entire valve assembly. A problem then arises in obtaining a good seal at the point where the line was initially punctured. It is exceedingly difficult to place the clamping elements of a new valve assembly in the exact position as the previous valve assembly so that the puncture in the tubing can be sealed when the air-conditioning system is recharged. As a result, the tube itself will often need to be replaced leading to additional expense, particularly involving labor costs of the mechanic working on the system.

SUMMARY OF THE INVENTION

It is therefore among the objectives of this invention to provide a line-piercing valve assembly, particularly adapted for automotive air-conditioning systems, which is simple in construction, which is easy to install, which is repairable without requiring replacement of the line to which it is mounted, and, which can be mounted in essentially any location along the air-conditioning system.

These objectives are accomplished in a line-piercing valve assembly which comprises first and second clamp housings, adapted to releasably clamp onto a line or section of tubing, a piercing pin insertable within the internal bore of a projection formed on the first clamp housing, and, a separate one-way valve which mounts within the projection after removal of the piercing pin and can itself be removed and replaced in the event of damage or malfunction.

This invention is predicated upon the concept of the provision of an easy to install line-piercing valve assembly having a one-way valve element which can be removed and replaced with a new valve element without removing or changing the position of the remaining elements of the valve assembly. The first and second clamp housings are essentially permanently mounted to the desired location along a section of line or tubing associated with the air-conditioning system of an automobile or other vehicle. The internal bore formed in the projection of the first clamp housing receives the piercing pin which is axially movable therein to a position where the pointed tip of the piercing pin engages and punctures the tubing. A gasket is mounted at the location where the tip of the piercing pin enters the tubing to prevent leakage of refrigerant once the air-conditioning system is charged.

An important aspect of this invention is that the piercing pin is completely removed after the tubing is punctured to make way for the one-way valve which is inserted within the internal bore of the projection on the first clamp housing. The one-way valve includes a valve body having external threads which mate with threads formed along the internal bore of the projection to secure the valve in place therein. In one presently preferred embodiment, a portion of the external wall of the projection is also formed with threads to receive a cap which covers the end of the one-way valve when not in use.

In order to inject refrigerant material into the tubing punctured by the valve assembly of this invention, the projection of the first clamp housing is either formed with external threads or a shoulder adapted to mate with a quick disconnect coupling. A refrigerant charging line is therefore threaded onto the projection, or engaged by a quick disconnect coupling, in order to open the one-way valve and permit the flow of refrigerant therethrough and into the internal bore of the projection to the punctured tubing. Once the refrigerant charging line is disconnected from the projection of the first clamp housing, the one-way valve closes and the refrigerant material is retained within the air-conditioning system of the automobile.

One advantage of the construction of this invention is that in the event of the failure of the one-way valve, the mechanic can remove the one-way valve within the projection of the first clamp housing and replace it with a new valve without disturbing the position of the remainder of the valve assembly. As a result, the first and second clamp housings can be permanently retained in position on the tubing with the seal undisturbed at the point where the tubing was punctured, unlike prior valve assemblies such as disclosed in U.S. Pat. No. 4,611,624 wherein the entire assembly must be removed in the event of a failure of the integral, valve portion. Additionally, the entire valve assembly can be removed from one line and re-used on another line, if desired.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 3 is an assembled view of the valve assembly depicted in FIG. 1 with the piercing pin shown puncturing a section of tubing; and FIG. 4 is a view similar to FIG. 3 except with the piercing pin removed and the one-way valve inserted.

DETAILED DESCRIPTION OF THE INVENTION

Figure 1:
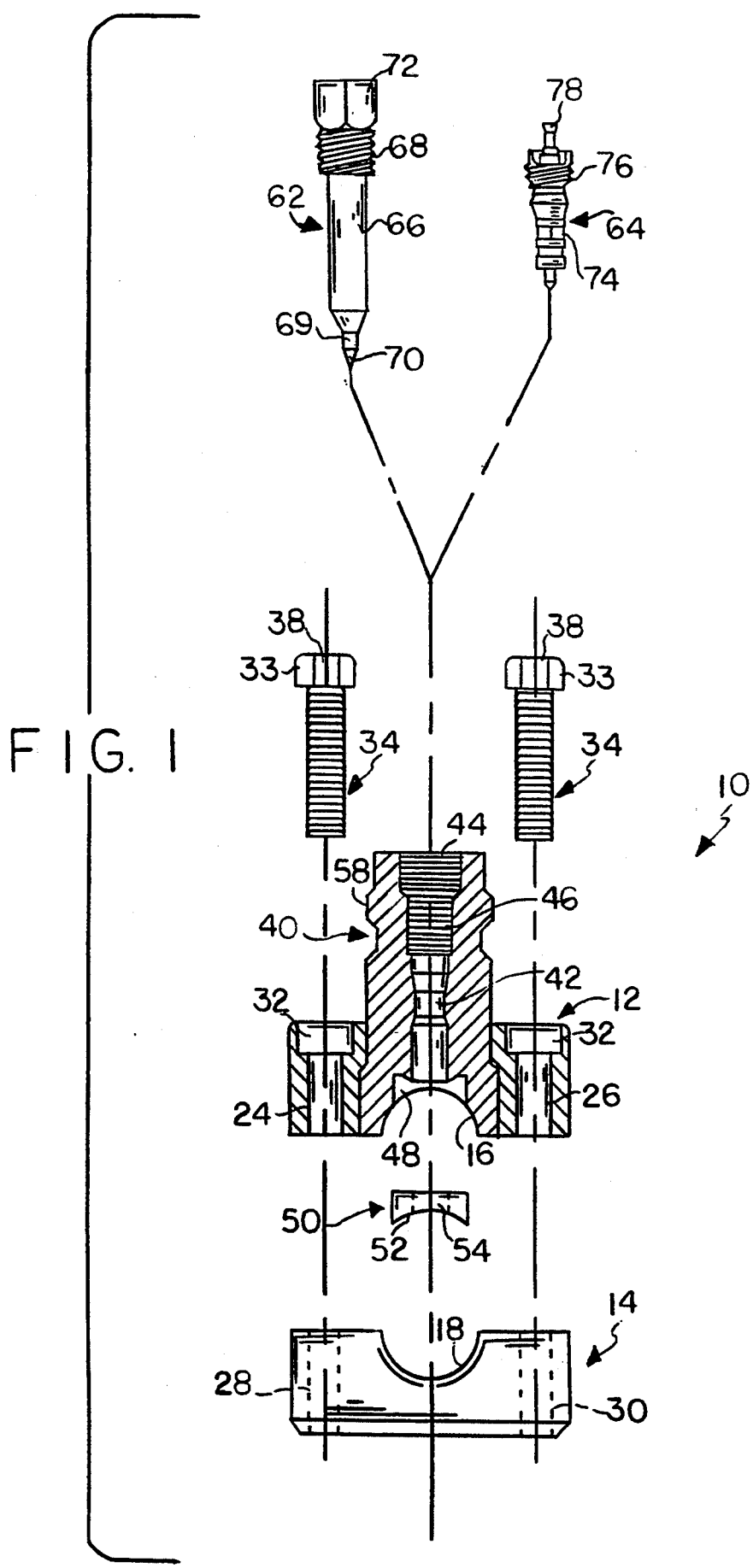
FIG. 1 is a disassembled, cross-sectional view of one embodiment of the valve assembly of this invention.

With reference initially to FIGS. 1, 3 and 4, one embodiment of a valve assembly 10 according to this invention is illustrated. The valve assembly 10 comprises a first clamp housing 12 and a second clamp housing 14 formed with elongated, semicircular shaped recesses 16, 18 respectively. Upon assembly of the first and second clamp housings 12, 14, as described below, the recesses 16, 18 together form a cylindrical bore 20 which is adapted to receive a section of tubing 22 therebetween.

The first clamp housing 12 is formed with a pair of throughbores 24, 26 which align with threaded throughbores 28, 30 respectively, formed in the second clamp housing 14. The throughbores 24, 26 of first clamp housing 12 are countersunk, as at 32, to receive the head 33 of cap screws 34. In order to attach the clamp housings 12, 14 to the tubing 22, the cap screws 34 are inserted through the throughbores 24, 26 of first clamp housing 12 and threaded into the threaded throughbores 28, 30 of second clamp housing 14. Preferably, the head 33 of each cap screw 34 is formed with a hex-shaped bore 38 to receive an Allen wrench which facilitates installation of the cap screws 34 within the first and second clamp housings 12, 14. As depicted in FIG. 3 and 4, and as noted above, when the clamp housings 12, 14 are interconnected their respective recesses 16, 18 form a cylindrical bore 20 within which the section of tubing 22 is securely clamped.

In the presently preferred embodiment, the first clamp housing 12 is also formed with a cylindrical projection 40 having a stepped internal bore 42 extending from one end of the projection 40 to the recess 16 of first clamp housing 12. For purposes of the present discussion, the internal bore 42 is described as having an "inner" end at the recess 16 and an "outer" end opposite thereto. The outer end of internal bore 42 is formed with a first threaded section 44, and a second threaded section 46 of smaller diameter. The inner end of internal bore 42 is formed with an annular seat 48 which receives a seal or gasket 50 having an arcuate surface 52 corresponding to the circumference of the tubing 22 to be held between the first and second clamp housings 12, 14, and a central throughbore 54. In the embodiment depicted in FIGS. 1, 3 and 4, the external surface of projection 40 is formed with a shoulder 58 which receives a quick-disconnect coupling 60 associated with a refrigerant charging line 62, shown in phantom in FIG. 4.

The valve assembly 10 further includes a piercing pin 62 and a one-way valve 64. The piercing pin 62 is formed with a shaft 66 having a threaded section 68 at one end, and a tapered section at the opposite end including a cylindrical portion 69 and a pointed tip 70. A hex head 72 or the like is mounted to the shaft 66 opposite its pointed tip 70. The one-way valve 64 is a commercially available item produced by a number of manufacturers such as Schrader and Piedmont which is widely used in the automotive industry on tires, for example, to permit the insertion of air into the tire but creating a seal against the escape of air therefrom. Valve 64 includes a valve body 74 formed with external threads 76 and a plunger 78 which, when depressed, opens valve 64 to permit the passage of liquid or gas therethrough.

Figure 2:
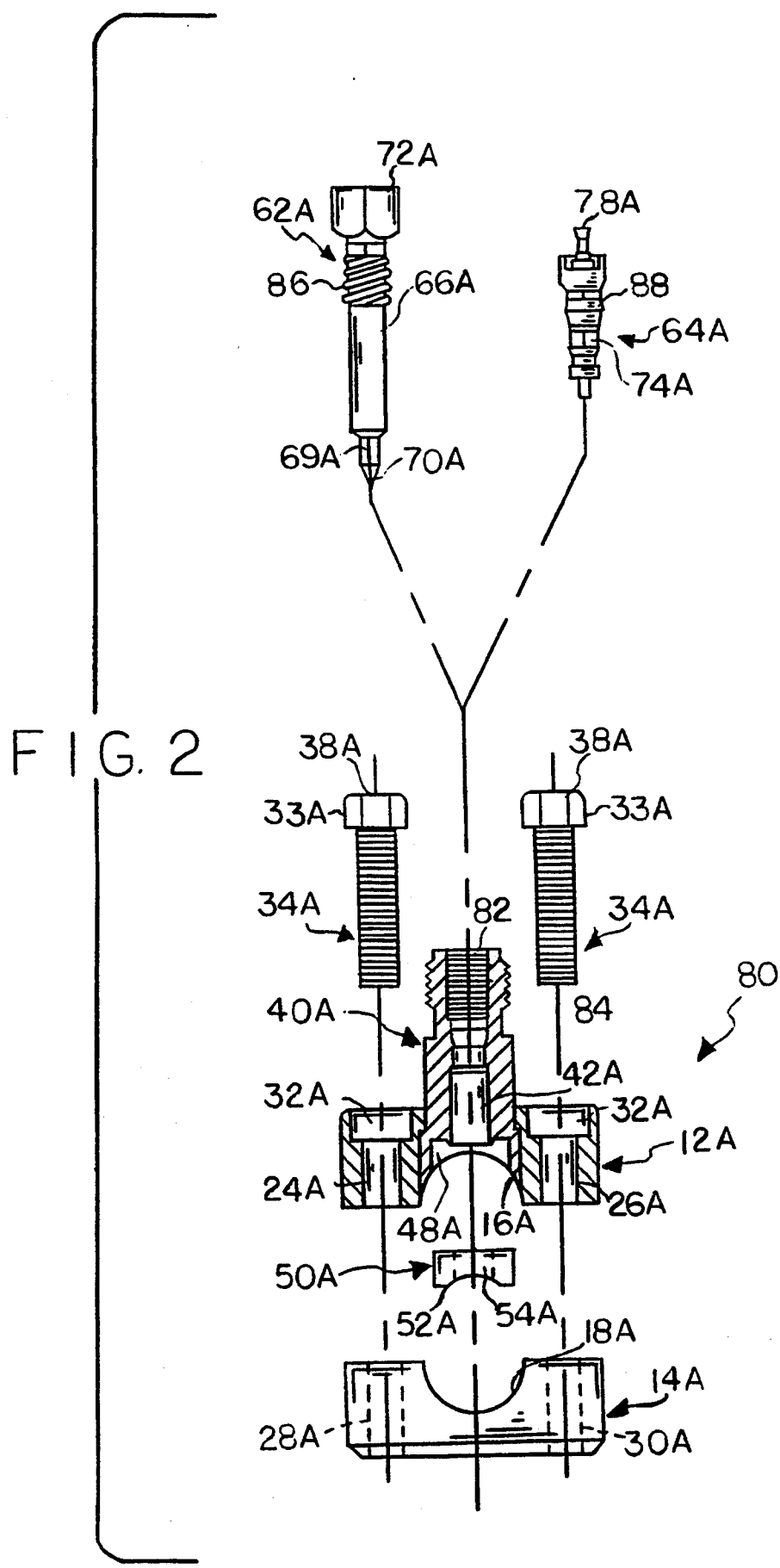
FIG. 2 is a view similar to FIG. 1 but of an alternative embodiment of the valve assembly herein.

With reference to FIG. 2, a valve assembly 80 is depicted which is similar to valve assembly 10 and therefore the same reference numbers are utilized to depict the same structure in both FIGS. with the addition of an "a" to the numbers in FIG. 2. One difference between valve assembly 80 and valve assembly 10 is that the cylindrical projection 40a of the valve assembly 64 has an internal bore 42a formed with a single threaded section 82 of constant diameter. Additionally, external threads 84 are formed along a portion of the outside of the cylindrical projection 40a to receive an internally threaded fitting of a refrigerant charging hose (not shown). Further, because the projection 40a of valve assembly 80 has a threaded section 84 of constant diameter, the piercing pin 62a and one-way valve 64a are formed with external threads 86, 88, respectively, of the same diameter. Otherwise, valve assembly 80 and 10 are identical.

MOUNTING AND OPERATION OF VALVE ASSEMBLY

With reference to FIGS. 1, 3 and 4, the assembly and operation of valve assembly 10 is depicted, it being understood that the valve assembly 80 is functionally identical.

The valve assembly 10 is initially mounted to the tubing 22 by positioning the first and second clamp housings 12, 14 around the tubing 22 so that the throughbores 24, 26 of first clamp housing 12 align with the threaded throughbores 28, 30 of second clamp housing 14. In this position, the cap screws 34 are inserted through the throughbores 24, 26 of first clamp housing 12 and threaded into the threaded throughbores 28, 30 of second clamp housing 14 by an Allen wrench or the like. The cap screws 34 are tightened down so that the head 36 thereof enters the countersunk portion 32 of throughbores 24, 26, and so that the gasket 50 carried within the annular seat 48 of first clamp housing 12 securely engages the sidewall of tubing 22.

It should be understood that the curvature of the recesses 16, 18 of first and second clamp housings 12, 14, which together define the cylindrical bore 20, are chosen to match the particular diameter of the tubing 22 to be clamped therebetween. Similarly, the curved, arcuate surface 52 of gasket 50 is formed to accommodate tubing 22 of given diameter. The size of the recesses 16, 18 of first and second clamp housings 12, 14, and the curvature of surface 52 of gasket 50, can be altered as desired to conform to the size of the particular tubing to be clamped.

Once the first and second clamp housings 12, 14 and seal 50 are firmly clamped about the tubing 22, the piercing operation can proceed. The piercing pin 62 is inserted into the internal bore 42 of the cylindrical projection 40 of first clamp housing 12 so that the threaded section 68 of piercing pin 52 engages the first threaded section 44 of internal bore 42. The piercing pin 52 is rotated and axially advances along the internal bore 42 in a direction toward the tubing 22. The pointed tip 70 of piercing pin 62 passes through the throughbore 54 of gasket 50 and punctures the wall of tubing 22 followed by the cylindrical portion 69 of the tapered end of piercing pin 62. As depicted in FIG. 2, the piercing pin 62 creates an access port 90 in the wall of tubing 22 having a diameter substantially equal to the diameter of the cylindrical portion 69 of piercing pin 62. The edges of seal 50 completely surround the access port 90 within tubing 22 creating an air-tight seal therebetween to prevent the escape of refrigerant or other material from the interior of tubing 22. After the tubing 22 has been punctured, the piercing pin 62 is rotated in the opposite direction to remove it from the internal bore 42 of cylindrical projection 40.

With the tubing 22 punctured and the piercing pin 62 removed from cylindrical projection 40, the one-way valve 64 is then inserted within the internal bore 42 of projection 40. As depicted in FIG. 4, the external threads 76 of valve 64 engage the second threaded section 46 of internal bore 42, and the valve 64 is tightened down so that its plunger 78 is substantially flush with the top or outer edge of the projection 40 of first clamp assembly 12. Importantly, in the event of the failure of the valve 64, it is readily removable from the cylindrical projection 40 and can be replaced by a new valve 64 whenever required.

In order to introduce refrigerant or other material into the tubing 22, a refrigerant charging hose 62 with a quick disconnect coupling 60 engages the shoulder 58 on cylindrical projection 40. This opens the one-way valve 64 by depressing its plunger 78 to permit the injection of refrigerant therethrough and along internal bore 42 of projection 40 into the access port 90 formed in the tubing 22. Upon removal of the charging hose 60, the valve 64 closes and a cap (not shown) can be placed over the projection 40 to protect the valve 64 from damage. Alternatively, as mentioned above, a refrigerant charging hose having an internally threaded fitting (not shown) is attached to the projection 40a of valve assembly 80 to introduce refrigerant therein.

While the invention has been described with reference to a preferred embodiment, it will be understood by those skilled in the art that various changes may be made and equivalents may be substituted for elements thereof without department from the scope of the invention. In addition, many modifications can be made to adapt a particular situation or material to the teachings of the invention without departing from the essential scope thereof.

For example, the valves 64, 64a described above have been characterized as "one-way" valves which permit the flow of refrigerant into the tubing 22. It should be understood that such valves 64, 64a could also be utilized to vent or remove refrigerant or other fluids from tubing 22 by merely depressing the valve plunger 78, 78a to open the valves 64, 64a and thus permit flow therethrough in the opposite direction.

Therefore, it is intended that the invention not be limited to the particular embodiment disclosed as the best mode contemplated for carrying out this invention, but that the invention will include all embodiments falling within the scope of the appended claims.

I claim:

1. A line-piercing valve assembly, comprising:
   a first clamp housing formed with a first recess, and a second clamp housing formed with a second recess, said first and second clamp housings being releasably connected to one another so that said first and second recesses thereof form a cylindrical bore adapted to receive and clamp a section of tubing therebetween;
   said first clamp housing being formed with a projection having an internal bore, one end of said internal bore being formed with at least one threaded portion and the opposite end of said internal bore being formed with a seat which terminates at said first recess;
   a piercing pin having a shaft formed with a threaded portion and a piercing tip, said piercing pin being insertable within said internal bore of said projection of said first clamp housing so that said threaded portion of said shaft mates with said threaded portion of said internal bore, said piercing pin being axially movable in a first direction within said internal bore so that said piercing tip thereof can engage and puncture the wall of a section of tubing held between said first and second clamp housings forming an access port therein, said piercing pin thereafter being axially movable in a second direction to completely remove said piercing pin from said internal bore;
   a one-way valve removably threadably insertable within said threaded portion of said internal bore of said projection of said first clamp housing to replace said removed piercing pin and to introduce and to discharge fluid through said internal bore and said one-way valve; and
   a gasket insertable within said seat of said first clamp housing in position to contact the section of tubing clamped in said cylindrical bore between said first and second clamp housings and to create a substantially air-tight seal around said access port in the tubing wall.

2. The valve assembly of claim 1 in which said one-way valve includes a valve body formed with external threads mateable with said threaded portion of said internal bore of said projection, said one-way valve being insertable and removable from said projection of said first clamp housing.

3. The valve assembly of claim 1 in which said one-way valve has a plunger movable between open and closed positions.

4. The valve assembly of claim 1 in which said projection of said first clamp housing is formed with external threads.

5. The valve assembly of claim 1 in which said projection of said first clamp housing is formed with an external shoulder adapted to receive a quick-disconnect coupling associated with a connecting line.

6. The valve assembly of claim 1 in which said internal bore in said projection of said first clamp housing is formed with a first threaded section engageable with said threaded portion of said shaft of said piercing pin, and a second threaded section engageable with threads formed on the outer surface of said one-way valve.

7. The valve assembly of claim 1 in which said internal bore in said projection of said first clamp housing is formed with a threaded section engageable with said threaded portion of said shaft of said piercing pin and with external threads formed on said one-way valve.

8. The valve assembly of claim 1 in which said gasket is formed with an arcuate surface which mates with the outer wall of the section of tubing, and a throughbore through which said piercing point of said piercing pin is insertable.

9. The valve assembly of claim 1 in which said shaft of said piercing pin is tapered at one end forming said piercing tip and a cylindrical portion adjacent to said piercing tip, said piercing pin being insertable into the section of tubing to an extent such that both the piercing tip and cylindrical portion thereof pass through the tubing wall to form said access port having substantially the same diameter as said cylindrical portion of said piercing pin.

* * * * *